(12) United States Patent
Kesselman et al.

(10) Patent No.: US 9,105,969 B2
(45) Date of Patent: *Aug. 11, 2015

(54) MECHANISM TO AVOID INTERFERENCE AND IMPROVE COMMUNICATION LATENCY IN MMWAVE WPANS

(75) Inventors: Alex Kesselman, San Jose, CA (US); Yuval Bachrach, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,122

(22) Filed: Mar. 1, 2012

(65) Prior Publication Data

US 2012/0218976 A1 Aug. 30, 2012

Related U.S. Application Data

(63) Continuation of application No. 12/252,607, filed on Oct. 16, 2008, now Pat. No. 8,149,806.

(51) Int. Cl.
*H01Q 3/26* (2006.01)
*H04W 72/12* (2009.01)
*H04B 7/06* (2006.01)

(52) U.S. Cl.
CPC ............. *H01Q 3/26* (2013.01); *H04B 7/0682* (2013.01); *H04W 72/1231* (2013.01)

(58) Field of Classification Search
None
See application file for complete search history.

(56) References Cited

U.S. PATENT DOCUMENTS

| 8,149,806 B2 * | 4/2012 | Kesselman et al. ........... 370/338 |
| 2002/0141375 A1 | 10/2002 | Choi |
| 2003/0152083 A1 * | 8/2003 | Nagata et al. ............. 370/395.4 |
| 2004/0037258 A1 | 2/2004 | Scherzer et al. |
| 2004/0196814 A1 | 10/2004 | Soderkvist et al. |
| 2006/0083161 A1 | 4/2006 | Laroia et al. |
| 2006/0114866 A1 | 6/2006 | Kim et al. |
| 2006/0133404 A1 | 6/2006 | Zuniga et al. |
| 2006/0203795 A1 | 9/2006 | Welborn et al. |
| 2006/0221999 A1 | 10/2006 | Bachrach et al. |
| 2007/0097867 A1 | 5/2007 | Kneckt et al. |
| 2007/0153702 A1 * | 7/2007 | Khan Alicherry et al. ... 370/252 |
| 2008/0070510 A1 * | 3/2008 | Doppler et al. ................. 455/69 |
| 2008/0176519 A1 | 7/2008 | Kwak et al. |

(Continued)

FOREIGN PATENT DOCUMENTS

| CN | 1460346 A | 12/2003 |
| JP | 06053918 A | 2/1994 |

(Continued)

OTHER PUBLICATIONS

International Search Report and Written Opinion received for PCT Patent Application No. PCT/US2009/036572, mailed on Dec. 8, 2009, 12 pages.

(Continued)

*Primary Examiner* — Anh-Vu Ly
(74) *Attorney, Agent, or Firm* — Schubert Law Group PLLC

(57) ABSTRACT

Briefly, a mechanism to avoid interference and improve channel efficiency in mmWave Wireless Personal Area Networks (WPANs) is disclosed. In particular, interference information during various time periods is tracked and used to optimize transmission scheduling. Further, a mechanism is provided to improve communication latency by distributing responsibility for coordination of slots amongst multiple transmitting devices.

25 Claims, 3 Drawing Sheets

(56) References Cited

U.S. PATENT DOCUMENTS

| | | | |
|---|---|---|---|
| 2009/0059855 A1* | 3/2009 | Nanda et al. | 370/329 |
| 2009/0073954 A1* | 3/2009 | Maltsev et al. | 370/347 |
| 2009/0196245 A1* | 8/2009 | Ji | 370/329 |
| 2009/0232103 A1 | 9/2009 | Kesselman | |
| 2009/0232116 A1 | 9/2009 | Kasselman et al. | |
| 2009/0233635 A1 | 9/2009 | Li et al. | |

FOREIGN PATENT DOCUMENTS

| | | | |
|---|---|---|---|
| JP | 06132888 A | 5/1994 | |
| JP | 2003-264490 A | 9/2003 | |
| JP | 2004-530349 A | 9/2004 | |
| JP | 2005-341293 A | 12/2005 | |
| JP | 2008-517539 A | 5/2008 | |
| JP | 2009-512360 A | 3/2009 | |
| TW | 553558 U | 9/2003 | |
| TW | I249306 B | 2/2006 | |
| WO | 2004/019627 A1 | 3/2004 | |
| WO | 2004/075590 A1 | 9/2004 | |
| WO | 2005/057970 A1 | 6/2005 | |
| WO | 2006/044718 A2 | 4/2006 | |
| WO | 2007/047669 A1 | 4/2007 | |
| WO | 2007/061014 A1 | 5/2007 | |
| WO | 2009/151671 A2 | 12/2009 | |
| WO | 2009/151671 A3 | 3/2010 | |

OTHER PUBLICATIONS

Office Action received for European Patent Application No. 09762967.9, mailed on Oct. 19, 2010, 2 pages.
Office Action received for Chinese Patent Application No. 200910138741.5 mailed on May 25, 2011, 4 pages of Office Action and 5 pages of English Translation.
IEEE Computer Society, 802.15.1TM IEEE Standard for Information technology—Telecommunications and information exchange between systems—Local and metropolitan area networks—Specific requirements Part 15.1: Wireless medium access control (MAC) and physical layer (pHY) specifications for wireless personal area networks (WPANs), IEEE Standards, Jun. 14, 2005, The Institute of Electrical and Electronics Engineers, Inc., New York, NY 10016-5997, USA (ISBN 0-7381-4708-7 SS95323).
Office Action received for Japanese Patent Application No. 2010-546145, mailed on May 8, 2012, 3 pages of office action and 3 pages of English Translation.
Office Action received for Korean Patent Application No. 10-2010-7020320, mailed on Feb. 8, 2012, 5 pages of office action and 5 pages of English Translation.
Office Action received for Korean Patent Application No. 10-2012-7014930, mailed on Aug. 13, 2012, 4 pages of office action and 4 pages of English Translation.
Office Action received for Chinese Patent Application No. 200910138741.5, mailed on Nov. 30, 2011, 4 pages of office action and 3 pages of English Translation.
Japanese Office Action Received for Japanese Patent Application No. 2010-546145, mailed on Dec. 4, 2012, 3 pages including 2 pages of English Translation.
Office Action Received for Taiwan Patent Application No. 98107697, mailed on Feb. 21, 2013, 17 pages of Office Action Including 9 pages of English Translation.
Office Action received for Korean Patent Application No. 10-2012-7014930, mailed on Apr. 26, 2013, 4 Pages of Office Action including 2 pages of English Translation.
Office Action Received for Japanese Patent Application No. 2010-546145, mailed on Aug. 20, 2013, 5 Pages of Office Action including 3 pages of English Translation.
IEEE Computer Society, 802.11TM IEEE Standard for Information Technology—Telecommunications and information exchange between systems—Local and metropolitan area networks—Specific requirements, Part 11: Wireless LAN Medium Access Control (MAC) and Physical Layer (PHY) Specifications, IEEE Standards, Jun. 12, 2007, pp. 1-1,232., The Institute of Electrical and Electronics Engineers, Inc., New York, NY 10016-5997, USA (ISBN 0-7381-5656-6 SS95708).
Wimedia Alliance, Inc., Distributed Medium Access Control (MAC) for Wireless Networks, Release 1.01 Dec. 15, 2006, pp. 1-182., WiMedia Alliance, Inc., San Ramon, CA, USA.
Multiband OFDM Alliance (MBOA) Special Interest Group (SIG) Wimedia Alliance, Inc., MultiBand OFDM Physical Layer Specification, Release 1.1.1, Feb. 27, 2007, pp. 1-156., MultiBand OFDM Alliance (MBOA) Special Interest Group (SIG) WiMedia Alliance, Inc., San Ramon, CA, USA.
IEEE Computer Society, 802.15.3TM IEEE Standard for Information technology—Telecommunications and information exchange between systems—Local and metropolitan area networks—Specific requirements, Part 15.3: Wireless Medium Access Control (MAC) and Physical Layer (PHY) Specifications for High Rate Wireless Personal Area Networks (WPANs), IEEE Standards, Sep. 29, 2003, pp. 1-324., The Institute of Electrical and Electronics Engineers, Inc., New York, NY 10016-5997, USA (ISBN 0-7381-3705-7 SS95136).
Smulders, Peter, "Exploiting the 60 GHz Band for Local Wireless Multimedia Access: Prospects and Future Directions." Communications Magazine, IEEE, Jan. 2002: pp. 140-147., vol. 40, Issue: 1., IEEE Communications Society, Institute of Electrical and Electronics Engineers, Inc., New York, NY, USA.
Extended European Search Report received for European Patent Application No. 09762967.9, mailed on Apr. 23, 2014, 7 Pages.
Notice of Grant received for Chinese Patent Application No. 200910138741.5, mailed on Apr. 9, 2012, 2 pages of Notice of Grant and 2 pages of English Translation.
Notice of Allowance received for Japanese Patent Application No. 2010-546145 , mailed on Aug. 12, 2014, 1 page of Notice of Allowance only.
Office Action received for Japanese Patent Application No. 2010-546145, mailed on Jun. 10, 2014, 1 page of Office Action only.
Office Action Received for Chinese Patent Application No. 201210213848.3, mailed on Jun. 24, 2014, 14 Pages of Office Action and 6 Pages of English Translation.
International Preliminary Report on Patentability and Written Opinion received for PCT Patent Application No. PCT/US2009/036572, mailed on Sep. 23, 2010, 7 pages.

* cited by examiner

MECHANISM TO AVOID INTERFERENCE AND IMPROVE COMMUNICATION LATENCY IN MMWAVE WPANS

BACKGROUND

Description of the Related Art

Millimeter-wave (mmWave) wireless personal area network (WPAN) communication systems operating in the 60 Gigahertz (GHz) frequency band are expected to provide several Gigabits per second (Gbps) throughput to distances of about ten meters and will be entering into the service in a few years. Currently several standardization bodies (IEEE 802.15.3c, WirelessHD SIG, ECMA TG20, COMPA and others) are considering different concepts for mmWave WPAN systems to define the systems which are the best suited for multi-Gbps WPAN applications.

An mmWave communication system is less robust than those at lower frequencies (for example, 2.4 GHz and 5 GHz bands) due to both oxygen absorption, which attenuates the signal over long range, and its short wavelength, which provides high attenuation through obstructions such as walls and ceilings. As a result, the use of directional antennas (such as a beamforming antenna, a sectorized antenna, or a fixed beam antenna) has been envisioned as useful for 60 GHz applications Inherent in any wireless communication systems is the need for improved throughput and latency. Thus, a strong need exists for techniques to improve mmWave wireless personal area networks.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DESCRIPTION OF THE EMBODIMENT(S)

Figure 1:
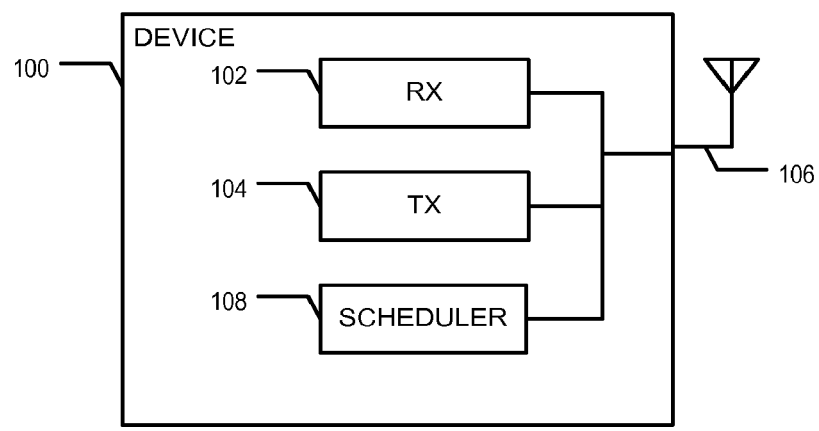
FIG. 1 illustrates a wireless device according to an embodiment of the present invention.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," and the like, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," and the like, to describe a common object, merely indicate that different instances of like objects are being referred to, and are not intended to imply that the objects so described must be in a given sequence, either temporally, spatially, in ranking, or in any other manner.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, or even high definition television signals in a personal area network (PAN).

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (for example, electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

The use of directional antennas in a network provides an opportunity to increase spatial reuse of available channels. Spatial reuse is the ability of the network to support concurrent transmissions that do not interfere with each other. An embodiment of the present invention provides an mmWave wireless personal area network (WPAN) communication system with a mechanism to avoid interference and improve spatial reuse efficiency. In particular, interference information during various time periods is tracked and used to optimize transmission scheduling. Further, a mechanism is provided to improve communication latency by distributing responsibility for coordination of slots amongst multiple transmitting devices.

FIG. 1 illustrates a wireless device according to an embodiment of the present invention. A device 100 includes a receiver (RX) 102, a transmitter (TX) 104, and an antenna system 106. Device 100 may include circuitry that is capable of transmitting and/or receiving data transmissions directionally. For example, antenna system 106 may include a beam forming antenna system, a sectorized antenna system, or a fixed beam antenna system. If device 100 is a coordinator, that is, a device that coordinates time slot allocation within a network, device 100 may include a scheduler that performs various functions, for example, optimizing a super-frame schedule to minimize interference among devices and maximize network bandwidth. Device 100 may include storage, processing circuitry, other communication interfaces, and the like (not shown).

Figure 2:
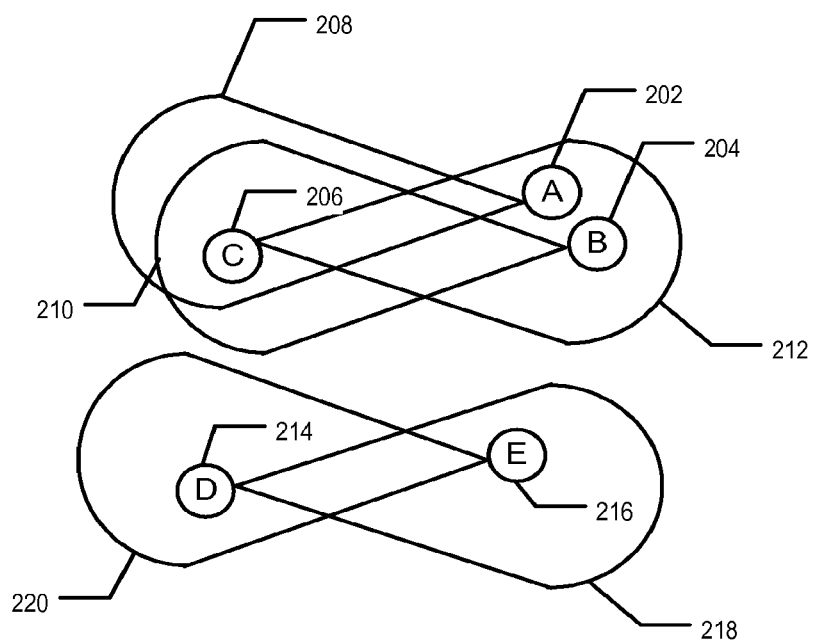
FIG. 2 illustrates an environment that supports concurrent transmissions that do not interfere with each other according to an embodiment of the present invention.

FIG. 2 illustrates an environment that supports concurrent transmissions that do not interfere with each other according to an embodiment of the present invention. Wireless devices A 202 and B 204 communicate with a wireless device C 206 as illustrated by directional transmission ranges 208 and 210, respectively. Wireless device C 206 communicates with wireless devices A 202 and B 204 as illustrated by directional transmission range 212. A wireless device D 214 communicates with a wireless device E 216 as illustrated by directional transmission range 218. Wireless device E 216 communicates with wireless device D 214 as illustrated by directional transmission range 220. Each such transmission range is representative of a uni-directional flow that may be referred to as a link. A link is a single transmission from a transmitter to a receiver. A full duplex flow, for example, between device A 202 and device C 206 generates two links.

The network including wireless devices A 202, B 204 and C 206 may be referred to as a Wireless Personal Area Network (WPAN). The network including wireless devices D 214 and E 216 may be part of the WPAN including devices A 202, B 204 and C 206 or may be part of another WPAN. As illustrated in FIG. 2, the transmission ranges of devices A 202, B 204, and C 206 do not interfere with the transmission ranges of devices D 214 and E 216. Thus, communications amongst these devices can operate concurrently because the energy from the transmitting devices are focused in different directions and thus do will not cause interference to each other. However, it should be apparent that if additional devices are present, or if the position of the devices were different, transmission ranges may interfere with each other or with the transmission ranges of other devices. For example, the links from device A 202 to device C 206 and from device C 206 to device A 202 may be independent from the links from device D 214 to device E 216 and from device E 216 to device D 214. In some environments, a transmission from device A 202 to device C 206 may occur in parallel, i.e., overlap in time, as a transmission from device D 214 to device E 216, while a transmission from device A 202 to device C 206 may not occur in parallel with a transmission from device E 216 to device D 214 due to interfering transmission ranges.

Figure 3:
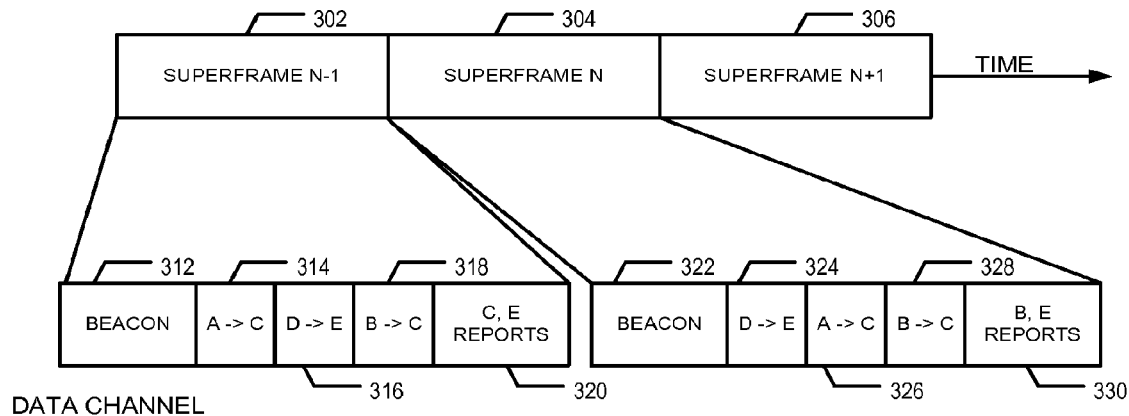
FIG. 3 illustrates a channel usage model according to an embodiment of the present invention.

FIG. 3 illustrates a channel usage model according to an embodiment of the present invention. The model consists of multiple super-frames 302, 304, and 306. Each super-frame is divided into multiple time slots for the transmission or reception of information using Time Division Multiple Access (TDMA) technology that typically does not support parallel transmissions. Super-frame 302 includes a beacon frame 312 and multiple transmission slots 314, 316, 318 allocated for the transmission of data. Channel time reservations are usually performed for each super-frame by a coordinator and communicated in beacon frame 312. Any of devices 202-206 and devices 214-216 may be designated as the coordinator. If devices 202-206 and devices 214-216 are in different WPANs, one of devices 202-206 and one of devices 214-216 may be designated as coordinators (not shown). Each channel time block is usually allocated for a unidirectional flow (for example, from a transmitting device to a receiving device).

In a high-density enterprise environment, the position of an individual device, the antenna type and its orientation determine the level of interference experienced by the device. As a result, the ability of different devices to receive a transmission successfully may vary over time. In TDMA systems, the super-frame schedules tend to follow a repeated pattern. Henceforth, the interference due to neighboring WPANs can be predicted to a certain extent for each channel time block.

According to an embodiment of the present invention, a TDMA system schedules transmissions in a way that minimizes the level of interference at the receiving devices and thus maximizes the WPAN throughput. Specifically, an interference mitigation scheme allows a coordinator to gather the interference information from the devices in its network. This information may be used to schedule transmissions in such a way that minimizes the interference experienced by each receiver.

According to an embodiment of the present inventions, to optimize allocation of channel time blocks to the links, the interference level at the receiving devices on the per-link basis is identified and communicated. For each link in the system, the receiver informs the coordinator about the interference level (noise strength or power) experienced during all channel time blocks scheduled for reception. For active channel time blocks, the receiving device monitors an experienced SNR (Signal-to-Noise Ratio) and later informs the coordinator of monitored levels. Table 1 shows a general interference report format for an individual link. The interference report sent by a device contains one vector per each link where the device is a receiver, which allows the coordinator to infer which channel time blocks are available for a certain link. Each device reports the interference level regardless of its source, which may in the same or in a different WPAN. For instance, for the WPAN shown in FIG. 2, two interference reports would be generated by C (for 2 links) and by E (for 1 link).

TABLE 1

Example Interference Report for a Link

| Channel Time Block | Interference/Signal Quality |
|---|---|
| Channel Time Block 1 (non-active) | Noise Strength/Power |
| ... | ... |
| Channel Time Block k (active) | SNR |
| ... | ... |
| Channel Time Block m (non-active) | Noise Strength/Power |

The sending of interference reports can be done on a periodic basis, for example, using time slots per receiver in a specially allocated channel time block that may be located at the end of the super-frame, such as reporting time slot 320. Alternatively, the reports can be delivered to the coordinator through an out-of-band (OOB) control channel or on a non-periodic basis, for example, when triggered by substantial changes in the interference level or signal quality degradation during a channel time block where the link under consideration is active. Once the reports reach the coordinator, the necessary updates to the schedule can be done in the subsequent super-frame. As illustrated, super-frame 304 includes a beacon 322, and multiple transmission slots 324, 326, 328 allocated for the transmission of data, optimized according to interference reports received in time slot 320. New interference reports are generated by the receivers, sent in time slot 330, and used to optimize scheduling for super-frame 306.

By optimizing scheduling based on interference reporting, the disclosed scheme provides efficient spatial reuse and allows non-interfering concurrent transmissions of devices in neighboring WPANs or within the same WPAN. It also increases the capacity and the overall throughput of an mmWave WPAN in a high-density environment and allows prompt adjusting of the super-frame schedule if the interference level changes. Further, the proposed scheme supports heterogeneous environments, where devices may have different antenna types and is amenable to efficient implementation because it is based on a simple centralized algorithm.

Figure 4:
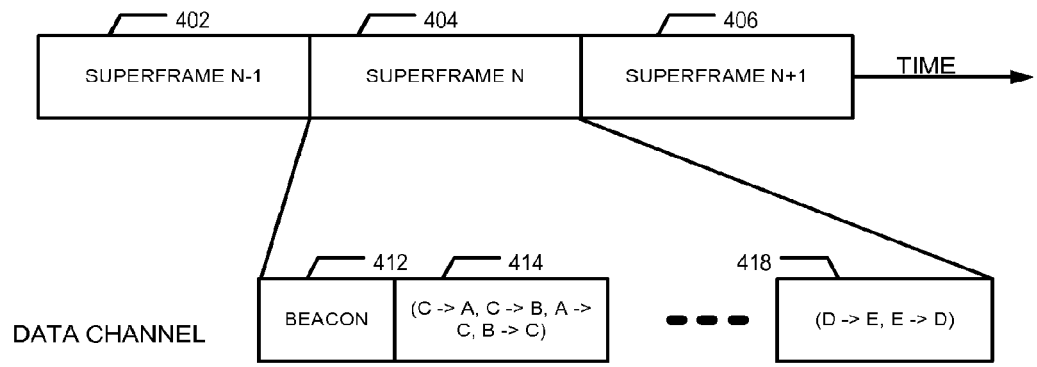
FIG. 4 illustrates an example of flow-based channel time schedule optimization according to an embodiment of the present invention.

FIG. 4 demonstrates an example of a flow-based channel time schedule optimization according to an embodiment of the present invention. The model illustrated in FIG. 4 includes multiple super-frames 402, 404 and 406. A system may include multiple composite flows, each of which includes one or more unidirectional flows. Further, a single device may participate in multiple flows. To improve spatial reuse, a one-to-many flow may include devices located in a close spatial proximity, which are likely to experience similar interference patterns. For example, the WPAN presented on FIG. 2 has two composite flows: {C->A, C->B, A->C, B->C} (one-to-many) and {D->E, E->D} (bidirectional).

According to embodiments of the present invention, some networks can significantly benefit by scheduling bi-directional or one-to-many communication flows within the same channel time block rather than allocating separate blocks for each unidirectional flow. As illustrated, super-frame 404 includes a beacon frame 412 to communicate schedules, and multiple time slots 414-418 for the transmission of data. Time slots 414-418 each contain multiple flows, bi-directional or one-to-many flows, to optimize throughput.

A protocol that sends large amounts of data in one direction and receives an acknowledgement message in the other direction, for example, the transport control protocol, TCP, may achieve increased throughput by allowing both TCP data and ACKs to be sent in a single time slot. Alternatively, if a coordinator wishes to poll a group of devices or perform a reliable multicast that must be acknowledged by all the devices in the group, performing all communication in one channel time block may be more efficient.

Channel access rules within a channel time block allocated to a specific composite flow are determined by the type of flow. If the composite flow operation involves two or more related flows associated with the same channel time block, one of these flows is designated as the primary flow and the others as the non-primary flows (for example, for a bidirectional TCP flow, TCP data is the primary and TCP ACK-s is the secondary flow). Initially, the transmitter of the primary flow has the channel access control. A non-primary flow is explicitly activated by the primary one. Then the channel access control can be passed back to the primary flow and so on so forth.

Figure 5:
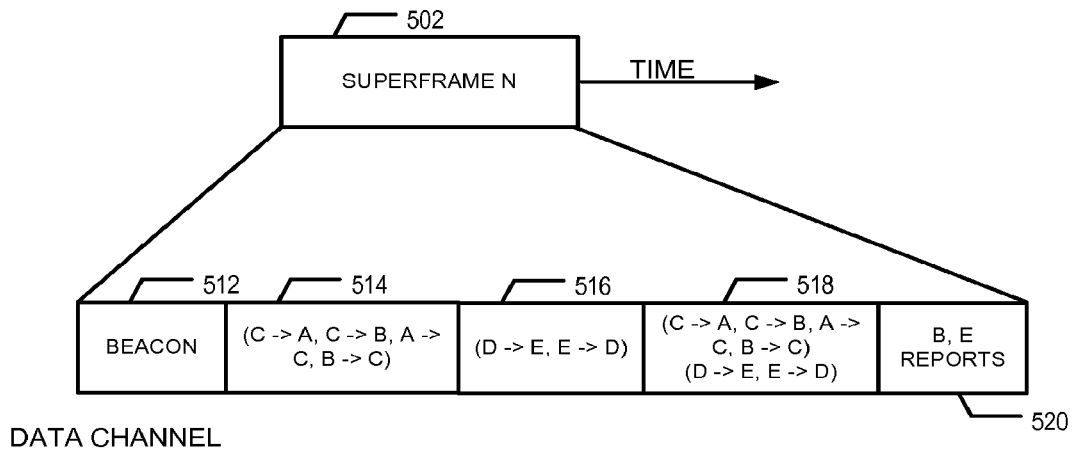
FIG. 5 illustrates another channel usage model according to an embodiment of the present invention.

FIG. 5 illustrates another channel usage model according to an embodiment of the present invention. This model includes a super-frame 502 that includes a beacon frame 512, multiple time slots 514-518 for the transmission of data, and a reporting time slot 520. As illustrated in time slots 512 and 516, multiple related flows may be assigned to each time slot. Further, spatial reuse allows scheduling non-interfering concurrent transmissions within the same WPAN as illustrated in time slot 518. As illustrated, if the devices have non-interfering transmission ranges, communications between device A 202 and device 206 C may be scheduled concurrently, that is, in the same time slot as communications between device D 214 and device E 216, as illustrated in time slot 518.

Figure 6:
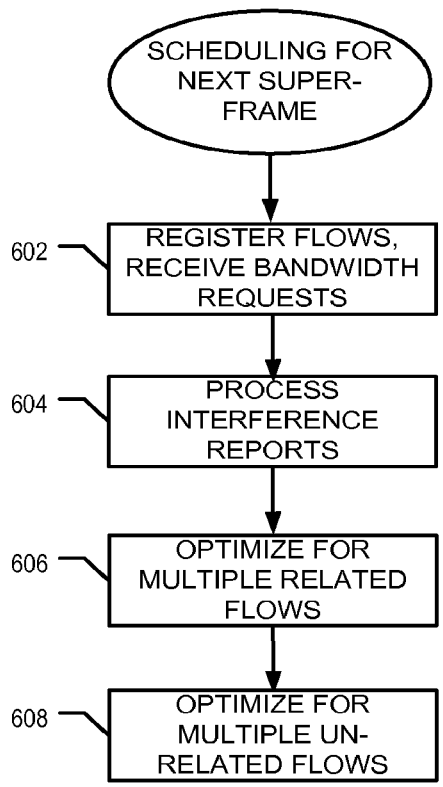
FIG. 6 illustrates a scheduling flow according to an embodiment of the present invention.

FIG. 6 illustrates a scheduling flow according to an embodiment of the present invention. During a flow establishment process, an initiating device registers the flow with a coordinator and sends a bandwidth allocation request (unless the initiating device is the coordinator itself), block 602. The coordinator processes the interference information gathered from the receivers of the corresponding unidirectional flows to optimize allocation of channel time blocks minimizing the level of interference, block 606. Further, the coordinator optimizes the schedule for multiple related flows, block 606 and for multiple un-related flows, block 608.

The disclosed scheme increases the capacity and the overall throughput of an mmWave WPAN in a high-density environment while maintaining protocol efficiency and latency. The proposed scheme mitigates interference and allows concurrent transmissions of devices in neighboring WPANs. The proposed scheme is amenable to efficient implementation being based on a simple centralized algorithm.

The following examples pertain to further embodiments and specifics in the examples may be used anywhere in one or more embodiments:

As a first example, an embodiment may comprise a method comprising: registering one or more transmission flows, wherein a transmission flow comprises a transfer of data from a transmitting device to a receiving device; receiving a bandwidth request for at least one of the one or more transmission flows; scheduling the at least one of the one or more transmission flows to a timeslot in a super-frame; receiving an interference report from one or more devices; and optimizing a transmission schedule for a subsequent super-frame to minimize interference and maximize bandwidth based on the interference report from the one or more devices.

One embodiment may comprise the method as recited in the first example, wherein the scheduling comprises assigning two or more flows to a same time slot. Another embodiment may comprise the method as recited in the first example, wherein the scheduling comprises assigning a primary flow to a time slot wherein the primary flow coordinates any secondary flows within the time slot. And a further embodiment may comprise the method as recited in the first example, wherein the scheduling comprises assigning the at least one of the one or more transmission flows to a time slot where an un-registered flow is active.

As a second example, an embodiment may comprise the method as recited in the first example, wherein the interference report includes interference information during periods of time when one of the one or more devices is active and during periods of time when the one of the one or more devices is inactive. An embodiment may comprise the method as recited in the second example, where the interference information during the periods of time when the one of the one or more devices is active includes signal to noise ratio information. An embodiment may comprise the method as recited in the second example, wherein the interference information during the periods of time when the one of the one or more devices is inactive includes noise strength and power information. An embodiment may comprise the method as recited in the first example, wherein the interference report is received during a pre-scheduled time slot. An embodiment may comprise the method as recited in the first example, wherein the interference report is received on an out-of-band channel. And, an embodiment may comprise the method as recited in the first example, wherein the one or more transmission flows are directional communications.

As a third example, a method comprising: generating an interference report; and transmitting the interference report to a coordinator. As a fourth example, an embodiment may comprise the method as recited in the third example, wherein the interference report includes interference information during active periods of time and interference information during inactive periods of time. An embodiment may comprise the method as recited in the fourth example, wherein the interference information during active periods of time includes signal to noise ratio information and wherein the interference information during inactive periods of time includes noise strength and power information. An embodiment may comprise the method as recited in the third example, further comprising transmitting the interference report during a pre-scheduled time slot. An embodiment may comprise the method as recited in the third example, further comprising transmitting the interference report on an out-of-band channel. And, a further embodiment may comprise the method as recited in the third example, further comprising transmitting the interference report in a directional communication.

As a fifth example, an embodiment may comprise an apparatus comprising: an antenna system; a receiver to receive a bandwidth request for one or more transmission flows on the antenna system; and a scheduler to optimize a transmission schedule for a super-frame to minimize interference and maximize bandwidth. An embodiment may comprise the apparatus recited in the fifth example, further comprising the scheduler to register the one or more transmission flows, wherein a transmission flow comprises a transfer of data from a transmitting device to a receiving device. An embodiment may comprise the apparatus recited in the fifth example, further comprising the scheduler to assign two or more flows to a same time slot. An embodiment may comprise the apparatus recited in the fifth example, further comprising the scheduler to assign a primary flow to a time slot wherein the primary flow coordinates any secondary flows within the time slot. An embodiment may comprise the apparatus recited in the fifth example, the receiver further to receive an interference report; and the scheduler further to process the interference report and optimize the transmission schedule based on the interference report. An embodiment may comprise the apparatus recited in the fifth example, further comprising the scheduler to assign the one or more transmission flows to a time slot where an un-registered flow is active. And, a further embodiment may comprise the apparatus recited in the fifth example, the receiver further comprising an out-of-band channel communication interface to receive the interference report.

As a sixth example, an embodiment may comprise an apparatus comprising: a receiver to track interference information during active and interference information during inactive periods of time and to generate an interference report; and a transmitter to transmit the interference report to a coordinator. An embodiment may comprise the apparatus recited in the sixth example, wherein the interference information during active periods of time includes signal to noise ratio information and wherein the interference information during inactive periods of time includes noise strength and power information. An embodiment may comprise the apparatus recited in the sixth example, wherein the interference report is transmitted during a pre-scheduled time slot. An embodiment may comprise the apparatus recited in the sixth example, wherein the interference report is transmitted on an out-of-band channel. And, a further embodiment may comprise the apparatus recited in the sixth example, wherein the transmitter transmits the interference report in a directional communication.

As a seventh example, an embodiment may comprise a method comprising: registering one or more transmission flows, wherein a transmission flow comprises a transfer of data from a transmitting device to a receiving device; receiving a bandwidth request for at least one of the one or more transmission flows; scheduling the at least one of the one or more transmission flows for a super-frame; wherein the scheduling comprises assigning a primary flow to a time slot wherein the primary flow coordinates any secondary flows within the time slot. And a further embodiment may comprise the method recited in the seventh example, wherein the one or more transmission flows are directional communications.

The techniques described above may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein. Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (I/O) devices. A computing system processes information according to a program and produces resultant output information via I/O devices.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method, comprising:
generating, by a coordinator of a wireless personal area network (WPAN), a first transmission schedule of a plurality of transmission flows, the first transmission schedule comprising three or more transmission flows involving three or more devices of the WPAN in one channel time block, wherein one of the three or more transmission flows is designated as a primary flow and the others of the three or more transmission flows are designated as non-primary flows, a device with the transmission flow designated as the primary flow to have channel access control and to explicitly activate each non-primary flow, the first transmission schedule for a first super-frame, wherein each of the plurality of transmission flows comprises a transfer of data from a transmitting device of the WPAN to a receiving device of the WPAN;
wirelessly receiving, by the coordinator of the WPAN, an interference report from one or more devices of the WPAN; and
based at least on the interference report, generating, by the coordinator of the WPAN, a second transmission schedule of the plurality of transmission flows, the second transmission schedule for a second super-frame, the second super-frame subsequent to the first superframe;

wherein the first transmission schedule and the second transmission schedule order the plurality of transmission flows differently.

2. The method of claim 1, further comprising receiving, by a coordinator of the WPAN, a bandwidth request for at least one of the one or more transmission flows.

3. The method of claim 1, wherein the first transmission schedule and the second transmission schedule comprise the same plurality of transmission flows.

4. The method of claim 1, wherein generating the second transmission schedule comprises the scheduling, wherein scheduling comprises assigning, by the coordinator of the WPAN, a primary flow to a channel time block and a secondary flow to the channel time block.

5. The method of claim 1, wherein generating the second transmission schedule comprises generating the second transmission schedule based upon the interference report comprising interference information during periods of time when the one of the one or more devices of the WPAN is active and during periods of time when the one of the one or more devices of the WPAN is inactive.

6. The method of claim 5, wherein generating the second transmission schedule comprises generating the second transmission schedule based upon the interference report during the periods of time when the one of the one or more devices of the WPAN is active comprising signal to noise ratio information.

7. The method of claim 5, wherein generating the second transmission schedule comprises generating the second transmission schedule based upon the interference report during the periods of time when the one of the one or more devices of the WPAN is inactive comprising noise strength and power information.

8. The method of claim 1, wherein:
generating the second transmission schedule comprises generating the second transmission schedule based upon the interference report, the interference report being received by the coordinator of the WPAN during a pre-scheduled time slot in the first super-frame, the pre-scheduled time slot being separate from time slots in the first super-frame scheduled for transmission flows; and
wirelessly receiving the interference report comprises receiving, from each receiving device in the WPAN scheduled to receive during the first super-frame, an interference report during the pre-scheduled time slot.

9. The method as recited in claim 1, wherein wirelessly receiving the interference report comprises receiving the interference report on a non-periodic basis; wherein communication of the interference report is triggered by a substantial change in an interference level during a time slot of a super-frame or by signal quality degradation during a time slot of a super-frame.

10. The method as recited in claim 1, wherein generating the schedules to order the plurality of transmission flows comprises generating the schedules to order directional wireless communications.

11. An apparatus of a coordinator of a wireless personal area network (WPAN), the apparatus comprising:
an antenna system;
a receiver to receive, by the coordinator of the WPAN, an interference report from one or more devices of the WPAN; and
a scheduler, the scheduler to
generate a first transmission schedule of a plurality of transmission flows, the first transmission schedule comprising three or more transmission flows involving three or more devices of the WPAN in one channel time block, wherein one of the three or more transmission flows is designated as a primary flow and the others of the three or more transmission flows are designated as non-primary flows, a device with the transmission flow designated as the primary flow to have channel access control and to explicitly activate each non-primary flow, the first transmission schedule for a first super-frame, wherein each of the plurality of transmission flows comprises a transfer of data from a transmitting device of the WPAN to a receiving device of the WPAN, and
generate, based at least on the interference report, of a second transmission schedule of the plurality of transmission flows, the second transmission schedule for a second super-frame, the second super-frame subsequent to the first super-frame;
wherein the first transmission schedule and the second transmission schedule order the plurality of transmission flows differently.

12. The apparatus of claim 11, wherein the first transmission schedule and the second transmission schedule include the same plurality of transmission flows.

13. The apparatus of claim 11, wherein the interference report includes interference information during periods of time when the one of the one or more devices of the WPAN is active and during periods of time when the one of the one or more devices of the WPAN is inactive.

14. The apparatus of claim 13, wherein the interference information during the periods of time when the one of the one or more devices of the WPAN is active includes signal to noise ratio information.

15. The apparatus of claim 14, wherein the interference information during the periods of time when the one of the one or more devices of the WPAN is inactive includes noise strength and power information.

16. The apparatus of claim 11, wherein the plurality of transmission flows includes a primary transmission flow and a secondary transmission flow; and wherein the scheduler is to assign the primary transmission flow and the secondary transmission flow within a same channel time block of the second super-frame.

17. The apparatus of claim 16, wherein the primary transmission flow comprises TCP data and the secondary transmission flow comprises TCP ACKs.

18. The apparatus of claim 11, wherein the plurality of the transmission flows comprise directional wireless transmissions.

19. An article comprising:
a non-transitory computer-readable storage medium, the computer readable storage medium comprising instructions, which when executed by one or more processors, configure a computing system to perform operations comprising:
generating by a coordinator of a wireless personal area network (WPAN) a first transmission schedule of a plurality of transmission flows, the first transmission schedule comprising three or more transmission flows involving three or more devices of the WPAN in one channel time block, wherein one of the three or more transmission flows is designated as a primary flow and the others of the three or more transmission flows are designated as non-primary flows, a device with the transmission flow designated as the primary flow to have channel access control and to explicitly activate each non-primary flow, the first transmission schedule for a first super-frame, wherein each of the plurality of transmission flows comprises a transfer of data from a transmitting device of the WPAN to a receiving device of the WPAN;

wirelessly receiving by the coordinator of the WPAN an interference report from one or more devices of the WPAN; and based at least on the interference report, generating by the coordinator of the WPAN a second transmission schedule of the plurality of transmission flows, the second transmission schedule for a second super-frame, the second super-frame subsequent to the first super-frame;

wherein the first transmission schedule and the second transmission schedule order the plurality of transmission flows differently.

20. The article of claim 19, further comprising receiving, by a coordinator of the WPAN, a bandwidth request for at least one of the one or more transmission flows.

21. The article of claim 19, wherein generating the second transmission schedule comprises the scheduling, wherein scheduling comprises assigning, by the coordinator of the WPAN, a primary flow to a channel time block and a secondary flow to the channel time block.

22. The article of claim 19, wherein generating the second transmission schedule comprises generating the second transmission schedule based upon the interference report comprising interference information during periods of time when the one of the one or more devices of the WPAN is active and during periods of time when the one of the one or more devices of the WPAN is inactive.

23. The article of claim 22, wherein generating the second transmission schedule comprises generating the second transmission schedule based upon the interference report during the periods of time when the one of the one or more devices of the WPAN is active comprising signal to noise ratio information.

24. The article of claim 22, wherein generating the second transmission schedule comprises generating the second transmission schedule based upon the interference report during the periods of time when the one of the one or more devices of the WPAN is inactive comprising noise strength and power information.

25. The article of claim 19, wherein:

generating the second transmission schedule comprises generating the second transmission schedule based upon the interference report, the interference report being received by the coordinator of the WPAN during a pre-scheduled time slot in the first super-frame, the pre-scheduled time slot being separate from time slots in the first super-frame scheduled for transmission flows; and wirelessly receiving the interference report comprises receiving, from each receiving device in the WPAN scheduled to receive during the first super-frame, an interference report during the pre-scheduled time slot.

\* \* \* \* \*